United States Patent
Burry et al.

(10) Patent No.: US 9,760,789 B2
(45) Date of Patent: Sep. 12, 2017

(54) ROBUST CROPPING OF LICENSE PLATE IMAGES

(75) Inventors: Aaron Michael Burry, Ontario, NY (US); Claude Fillion, Rochester, NY (US); Vladimir Kozitsky, Rochester, NY (US); Raja Bala, Webster, NY (US); Zhigang Fan, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 377 days.

(21) Appl. No.: 13/448,976

(22) Filed: Apr. 17, 2012

(65) Prior Publication Data
US 2013/0272579 A1 Oct. 17, 2013

(51) Int. Cl.
*G06K 9/32* (2006.01)
(52) U.S. Cl.
CPC ....... *G06K 9/3258* (2013.01); *G06K 2209/15* (2013.01)
(58) Field of Classification Search
CPC ... G06K 2209/15; G06K 9/325; G08G 1/0175
See application file for complete search history.

(56) References Cited

U.S. PATENT DOCUMENTS

| 5,081,685 | A  | * | 1/1992  | Jones et al. ............... 382/105 |
| 6,185,338 | B1 |   | 2/2001  | Nakamura ................. 382/229 |
| 6,449,391 | B1 |   | 9/2002  | Ku ............................. 382/194 |
| 7,302,085 | B2 |   | 11/2007 | Sasaki et al. ............... 382/105 |
| 8,059,868 | B2 |   | 11/2011 | Matsumoto et al. ......... 382/105 |
| 2007/0292029 | A1 | * | 12/2007 | Wang et al. ................. 382/181 |
| 2008/0285804 | A1 |   | 11/2008 | Sefton ......................... 382/105 |
| 2009/0202105 | A1 |   | 8/2009  | Castro Abrantes et al. .. 382/100 |
| 2011/0135156 | A1 |   | 6/2011  | Chen et al. .................. 382/105 |

OTHER PUBLICATIONS

Carlson, "SNoW User Guide", University of Illinois, Urbana/Champaign, Aug. 1999.*
Kapadia, Pramod S. "Car license plate recognition using template matching algorithm." (2010).*
(Continued)

*Primary Examiner* — Stephen R Koziol
*Assistant Examiner* — Raphael Schwartz
(74) *Attorney, Agent, or Firm* — Kevin Soules; Kermit D. Lopez; Luis M. Ortiz

(57) ABSTRACT

A method, system, and computer-usable tangible storage device for robustly cropping and accurately recognizing license plates to account for noise sources and interfering artifacts are disclosed. License plate images and sub-images can be tightly cropped utilizing an image-based classifier and gradient-based cropping. An image-based classifier can identify the location of valid characters within the image. Because of a number of noise sources, such as, for example, residual plate rotation and shear in the characters within the image, the image-based classifier performs a "rough" identification of the image boundaries. An additional processing step utilizing gradient-based cropping is performed to fine-tune the license plate image boundaries. Gradient-based cropping eliminates unwanted border artifacts that could substantially impact the segmentation and license plate character recognition results.

10 Claims, 15 Drawing Sheets

(56) References Cited

OTHER PUBLICATIONS

W. Jia, X. He, and Q. Wu, "Segmenting Characters from License Plate Images with Little Prior Knowledge," in 2010 international Conference on Digital Image Computing, 2010, pp. 220-226.
Nilsson, M.; Dahl, M.; Claesson, I.; "The successive mean quantization transform," Acoustics, Speech, and Signal Processing, 2005. Proceedings. (ICASSP '05). IEEE International Conference on , vol. 4, No., pp. iv/429-iv/432 vol. 4, Mar. 18-23, 2005. M.
M. Yang and D. Roth and N. Ahuja, "A SNoW-based Face Detector," The Conference on Advances in Neural Information Processing Systems (NIPS) (2000) pp. 855-861.
Nilsson, M.; Nordberg, J.; Claesson, I.; "Face Detection using Local SMQT Features and Split up Snow Classifier", Acoustics, Speech and Signal Processing, 2007. ICASSP 2007. IEEE International Conference on , vol. 2, No., pp. II-589-II-592, Apr. 15-20, 2007.
HuaifengZhang; Wenjing Jia; Xiangjian He; Qiang Wu; , "Learning-Based License Plate Detection Using Global and Local Features," Pattern Recognition, 2006. ICPR 2006. 18th International Conference on , vol. 2, No., pp. 1102-1105.

\* cited by examiner

ROBUST CROPPING OF LICENSE PLATE IMAGES

TECHNICAL FIELD

Embodiments relate to data-processing systems and methods. Embodiments further relate to license plate reading technology. Embodiments also relate to the cropping and accurate recognition of license plates and license plate data.

BACKGROUND OF THE INVENTION

Automatic License Plate Reading ("ALPR") systems are used by security and law enforcement personnel to find and read vehicle license plate numbers in images produced by video cameras and still cameras. Unfortunately, a number of challenging noise sources are present in most real-world license plate images, such as, for example: heavy shadows, non-uniform illumination (e.g., from one vehicle to the next, daytime versus nighttime, etc.), challenging optical geometries (e.g., tilt, shear, or projective distortions), plate frames and/or stickers partially touching characters, partial occlusion of characters (e.g. trailer hitch ball), poor contrast, and general image noise (e.g. salt and pepper noise). Under these realistic noise conditions, it can be extremely challenging to accurately extract only the sub-image containing the license plate characters.

A particularly challenging aspect of this problem involves horizontal cropping of the license plate sub-image. Here, border artifacts, logos and special symbols, and strong image content outside the actual license plate region can prove particularly difficult. These extraneous image artifacts are often not easy to differentiate from valid characters, especially a "1," and can substantially impact subsequent character segmentation and recognition.

Prior proposed solutions are typically not fine-grained enough to be used for tight horizontal cropping and instead rely on inaccurate, coarse plate localization (i.e. "the plate is in here somewhere" type of result). Classifiers used in prior approaches for localization are typically constructed to recognize entire license plates, rather than individual symbols and characters.

Therefore, a need exists for a method and system to robustly crop and accurately recognize license plates to account for noise sources and interfering artifacts.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide for improved data-processing systems and methods.

It is another aspect of the disclosed embodiments to provide for improved license plate reading technology.

It is a further aspect of the disclosed embodiments to provide for robustly cropping and accurately recognizing license plates.

The above and other aspects can be achieved as is now described. A method, system, and computer-usable tangible storage device for robustly cropping and accurately recognizing license plates to account for noise sources and interfering artifacts are disclosed. License plate images and sub-images can be tightly cropped utilizing an image-based classifier and gradient-based cropping. An image-based classifier can identify the location of valid characters within the image. Because of a number of noise sources, such as, for example, residual plate rotation and shear in the characters within the image, the image-based classifier performs a "rough" identification of the image boundaries. An additional processing step utilizing gradient-based cropping is performed to fine-tune the license plate image boundaries. Gradient-based cropping eliminates unwanted border artifacts that could substantially impact the segmentation and license plate character recognition results.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
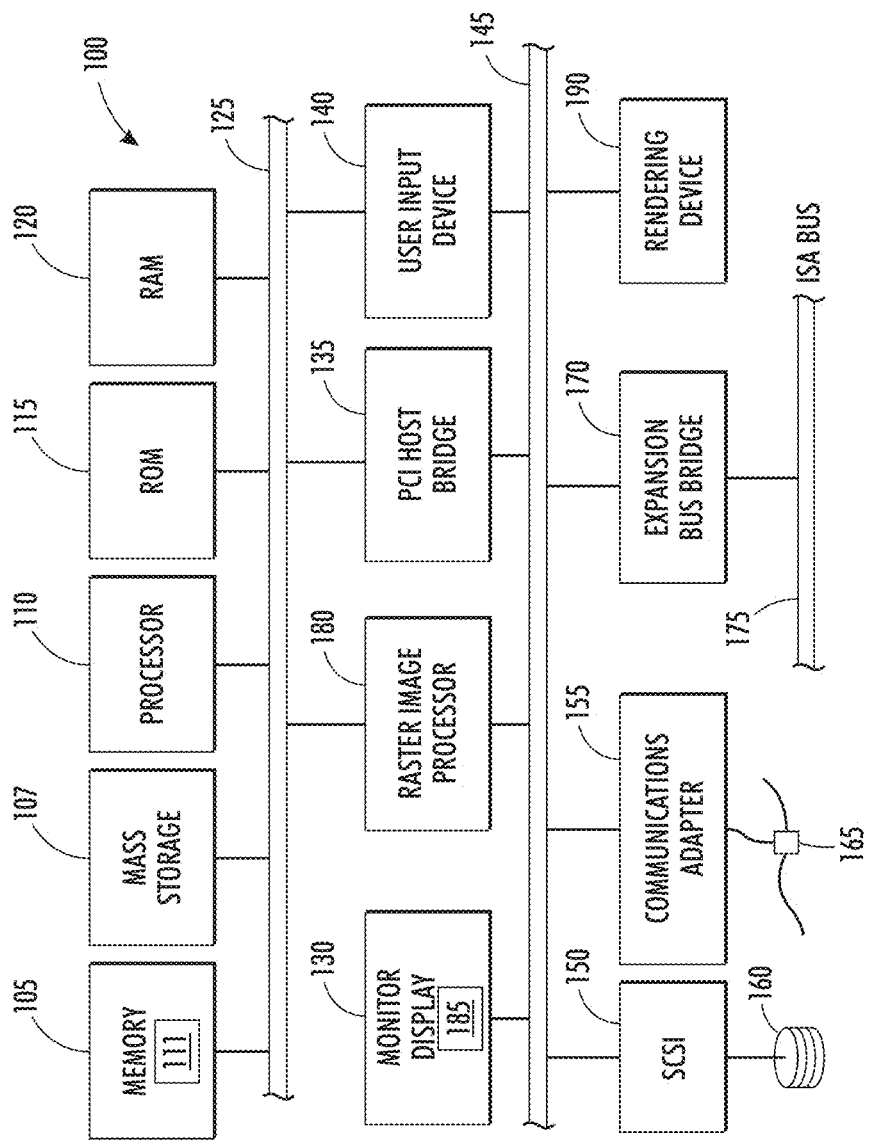
FIG. 1 illustrates an exemplary block diagram of an exemplary data-processing apparatus, which can be utilized for processing secure data, in accordance with the disclosed embodiments.

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, one or more of the disclosed embodiments can be embodied as a method, system, or computer program usable medium or computer program product. Accordingly, the disclosed embodiments can in some instances take the form of an entirely hardware embodiment, an entirely software embodiment or an embodiment combining software and hardware aspects all generally referred to herein as a "module". Furthermore, the disclosed embodiments may take the form of a computer usable medium, computer program product, a computer-readable tangible storage device storing computer program code, said computer program code comprising program instructions executable by said processor on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.) The computer program code, however, for carrying out operations of the present invention may also be written in conventional procedural programming languages, such as the "C" programming language or in a programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The disclosed embodiments are described in part below with reference to flowchart illustrations and/or block diagrams of methods, systems, computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

FIG. 1 illustrates a block diagram of a sample data-processing apparatus 100, which can be utilized for an improved license plate recognition method and system. Data-processing apparatus 100 represents one of many possible data-processing and/or computing devices, which can be utilized in accordance with the disclosed embodiments. It can be appreciated that data-processing apparatus 100 and its components are presented for generally illustrative purposes only and do not constitute limiting features of the disclosed embodiments.

As depicted in FIG. 1, a memory 105, a mass storage 107 (e.g., hard disk), a processor (CPU) 110, a Read-Only Memory (ROM) 115, and a Random-Access Memory (RAM) 120 are generally connected to a system bus 125 of data-processing apparatus 100. Memory 105 can be implemented as a ROM, RAM, a combination thereof, or simply a general memory unit. Module 111 includes software module in the form of routines and/or subroutines for carrying out features of the present invention and can be additionally stored within memory 105 and then retrieved and processed via processor 110 to perform a particular task. A user input device 140, such as a keyboard, mouse, or another pointing device, can be connected to PCI (Peripheral Component Interconnect) bus 145.

Data-process apparatus 100 can thus include CPU 110, ROM 115, and RAM 120, which are also coupled to a PCI (Peripheral Component Interconnect) local bus 145 of data-processing apparatus 100 through PCI Host Bridge 135. The PCI Host Bridge 135 can provide a low latency path through which processor 110 may directly access PCI devices mapped anywhere within bus memory and/or input/output (I/O) address spaces. PCI Host Bridge 135 can also provide a high bandwidth path for allowing PCI devices to directly access RAM 120.

A communications adapter 155 and a small computer system interface (SCSI) 150 are also shown. An expansion bus-bridge 170 can also be attached to PCI local bus 145. The communications adapter 155 can be utilized for connecting data-processing apparatus 100 to a network 165. SCSI 150 can be utilized to control high-speed SCSI disk drive 160. An expansion bus-bridge 170, such as a PCI-to-ISA bus bridge, may be utilized for coupling ISA bus 175 to PCI local bus 145. Note that PCI local bus 145 can further be connected to a monitor 130, which functions as a display (e.g., a video monitor) for displaying data and information for a user and also for interactively displaying a graphical user interface (GUI) 185. A user actuates the appropriate keys on the GUI 185 to select data file options. Note that the term "GUI" generally refers to a type of environment that represents programs, files, options and so forth by means of graphically displayed icons, menus, and dialog boxes on a computer monitor screen.

The embodiments described herein can be implemented in the context of a host operating system and one or more modules. Such modules may constitute hardware modules, such as, for example, electronic components of a computer system. Such modules may also constitute software modules. In the computer programming arts, a software "module" can be typically implemented as a collection of routines and data structures that performs particular tasks or implements a particular abstract data type.

Software modules generally can include instruction media storable within a memory location of an image processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term "module" as utilized herein can therefore generally refer to software modules or implementations thereof. Such modules can be utilized separately or together to form a program product that can be implemented through signal-bearing media, including transmission media and/or recordable media. An example of such a module that can embody features of the present invention is a license plate recognition module 155, as depicted in FIG. 2.

It is important to note that, although the embodiments are described in the context of a fully functional data-processing system (e.g., a computer system), those skilled in the art will appreciate that the mechanisms of the embodiments are capable of being distributed as a program product in a variety of forms, and that the present invention applies equally regardless of the particular type of signal-bearing media utilized to actually carry out the distribution. Examples of signal bearing media include, but are not limited to, recordable-type media such as media storage or CD-ROMs and transmission-type media such as analogue or digital communications links.

Figure 2:
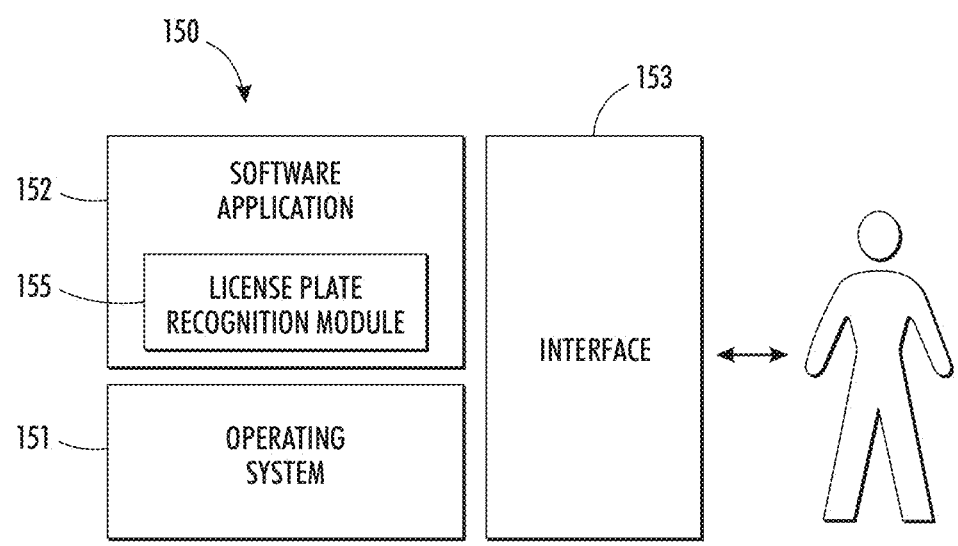
FIG. 2 illustrates an exemplary schematic view of an exemplary software system including an operating system, application software, and a user interface, in accordance with the disclosed embodiments.

FIG. 2 illustrates a schematic view of a software system 150 including an operating system, application software, and a user interface for carrying out the disclosed embodiments. Computer software system 150 directs the operation of the data-processing system 100 depicted in FIG. 1. Software application 152, stored in main memory 105 and on mass storage 107, includes a kernel or operating system 151 and a shell or interface 153. One or more application programs, such as software application 152, may be "loaded" (i.e., transferred from mass storage 107 into the main memory 105) for execution by the data-processing system 100. The data-processing system 100 receives user commands and data through the interface 153, as shown in FIG. 2. The user's command input may then be acted upon by the data-processing system 100 in accordance with instructions from operating module 151 and/or application module 152.

The interface 153 also serves to display and recognize license plates, whereupon the user may supply additional inputs or terminate the session. In an embodiment, operating system 151 and interface 153 can be implemented in the context of a "Windows" system. It can be appreciated, of course, that other types of systems are potential. For example, rather than a traditional "Windows" system, other operation systems, such as, for example, Linux may also be employed with respect to operating system 151 and interface 153. The software application 152 can include a license plate recognition module. The software application 152 can also be configured to communicate with the interface 153 and various components and other modules and features as described herein.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program design to assist in the performance of a specific task, such as word processing, accounting, inventory management, music program scheduling, etc.

Generally, program modules include routines, programs, objects, components, data structures, etc., that perform particular tasks or implement particular abstract data types. Moreover, those skilled in the art will appreciate that the disclosed method and system may be practiced with other computer system configurations, such as, for example, handheld devices, multi-processor systems, microprocessor-based or programmable consumer electronics, networked PCs, minicomputers, mainframe computers, and the like.

Figure 3:
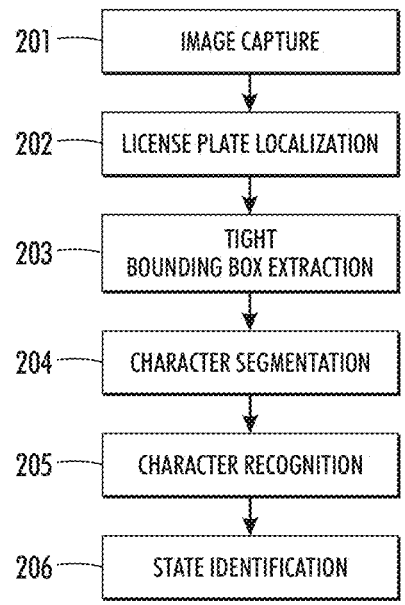
FIG. 3 illustrates an exemplary block diagram of an exemplary processing flow for the performance of license plate character segmentation, in accordance with the disclosed embodiments.

FIG. 3 illustrates an exemplary block diagram 200 of an exemplary processing flow for the performance of license plate character segmentation, in accordance with the disclosed embodiments. In an ALPR process, a license plate image is captured, as illustrated in block 201. The license plate is then localized, as illustrated in block 202. To minimize the computational load and to reduce the extraneous noises present in the license image, a tight bounding box ("TBB") sub-image is identified via extraction, as illustrated in block 203. Extracting license plate characters from the license plate TBB sub-image can include the following operations, for example: tilt removal, vertical cropping, and horizontal cropping. Character segmentation, as illustrated in block 204, can have a dramatic effect on the accuracy of the subsequent character recognition, as illustrated in block 205. The challenge for segmentation 204 is to provide a robust, highly accurate, computationally efficient solution which enables highly accurate character recognition 205 and identification of the license plate jurisdiction, as illustrated in block 206.

Figure 4:
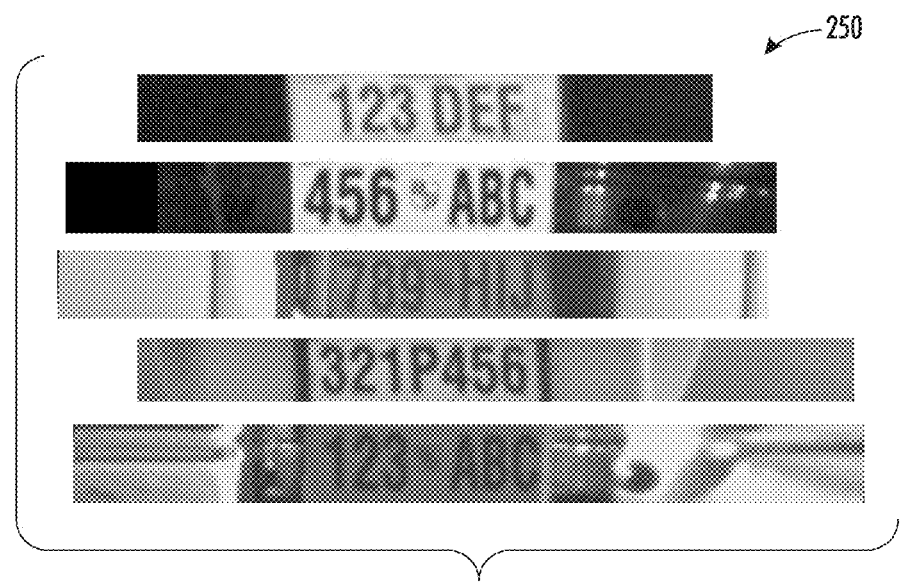
FIG. 4 illustrates an exemplary pictorial illustration of license plates with the tilt removed and vertically cropped ("TRVC"), in accordance with the disclosed embodiments.

FIG. 4 illustrates an exemplary pictorial illustration 250 of license plates with the tilt removed and vertically cropped ("TRVC"), in accordance with the disclosed embodiments. It is images such as those depicted in FIG. 4 for which a robust method of horizontal cropping is required. Horizontal cropping can be affected by the following, for example: license plate border artifacts; logos, special symbols, and other non-valid character content within the license plate itself; and strong image content outside the actual license plate region.

Figure 5:
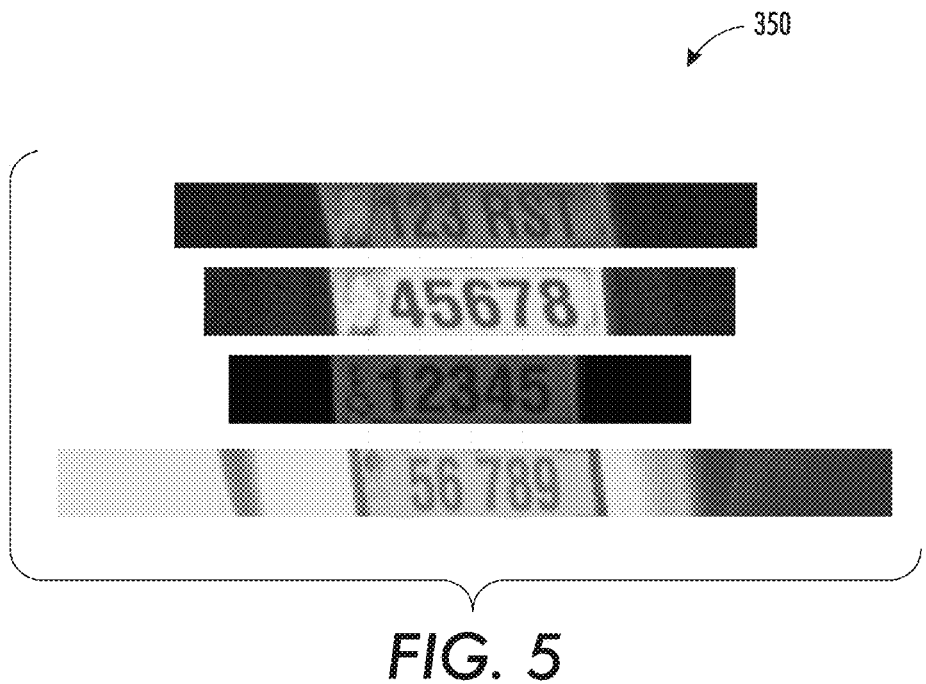
FIG. 5 illustrates an exemplary pictorial illustration of interfering artifacts, in accordance with the disclosed embodiments.

FIG. 5 illustrates an exemplary pictorial illustration 300 of interfering artifacts, in accordance with the disclosed embodiments. Border artifacts can be caused by hard edges in the image because of a strong contrast between the license plate, plate frame, and the background image of the vehicle. Unfortunately, in the character segmentation process, these edges are often difficult to distinguish from actual characters. The edges can look quite similar to a valid "1" in many cases. As a result, the presence of these edges can often result in one or more of the following: distortion of the segmentation cuts for the actual characters and/or inclusion of the border content as characters in the segmentation results. Thus, if extraneous edges from license plate borders and/or plate frames are not properly removed by the horizontal cropping of the license plate image, errors in character segmentation and subsequent recognition can result. Varying amounts of distance between the valid characters and the edges of the license plate, the presence of special symbols and logos, and the common use of license plate frames can make isolation and removal of border artifacts particularly challenging, as illustrated in FIG. 5.

Figure 6:
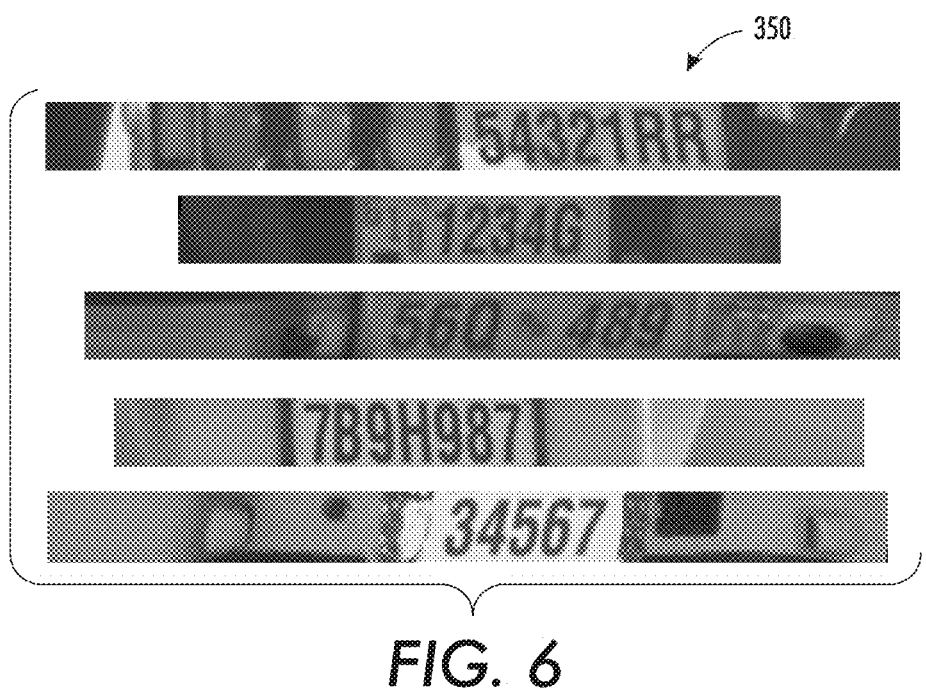
FIG. 6 illustrates an exemplary pictorial illustration of extraneous image content outside the actual license plate region, in accordance with the disclosed embodiments.

FIG. 6 illustrates an exemplary pictorial illustration 350 of extraneous image content outside the actual license plate region, in accordance with the disclosed embodiments. Large amounts of extraneous image content (i.e., noise sources) outside the actual license plate region is another particularly challenging problem for proper license plate cropping and character segmentation, as illustrated in FIG. 6. Using only texture-based or purely gradient-based methods to segment the license plate characters makes it difficult to differentiate valid license plate character content. If not properly removed, the noise sources outlined above can cause faulty segmentation and eventually errors in the character recognition process.

Figure 7:
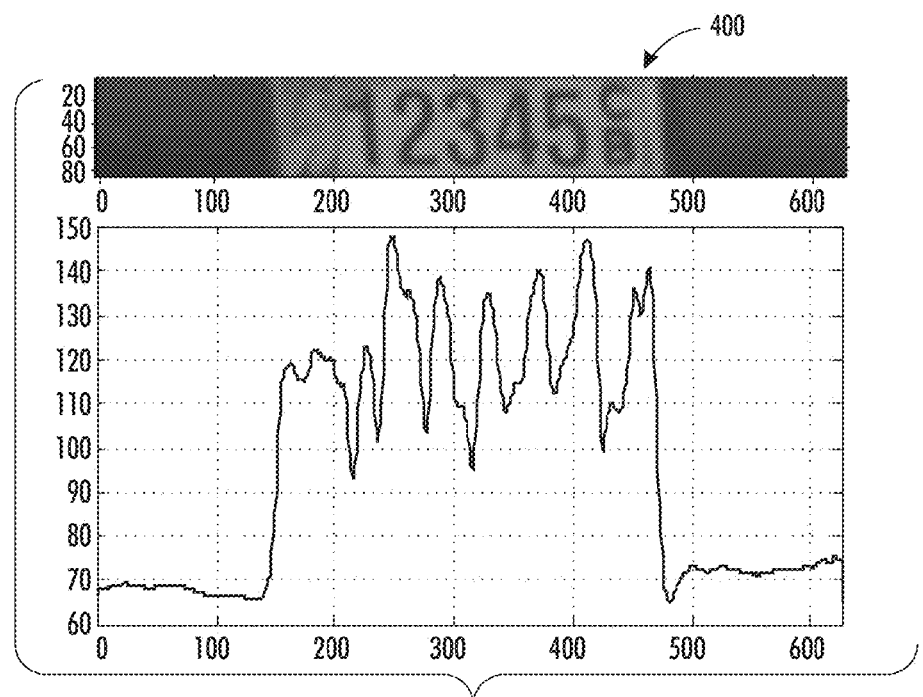
FIG. 7 illustrates an exemplary graphical illustration of projective segmentation for accurately cropping license plate images in the horizontal dimension, in accordance with the disclosed embodiments.

FIG. 7 illustrates an exemplary graphical illustration 400 of projective segmentation for accurately cropping license plate images in the horizontal dimension, in accordance with the disclosed embodiments. To accurately crop license plate images in the horizontal dimension, projective segmentation can be used to segment the license plate characters. In projective segmentation, the mean (or histogram 401) is taken along the columns of the image. An analysis of the peaks and troughs of the resulting data is then used to identify likely breaks between the license plate content and the background 402. Projective segmentation for cropping can be problematic for the following reasons: not very robust to real world noises like non-uniform illumination, poor contrast between the license plate and the vehicle background, excessive shear of the license plate in the image, or strong image content outside the license plate region.

Figure 8:
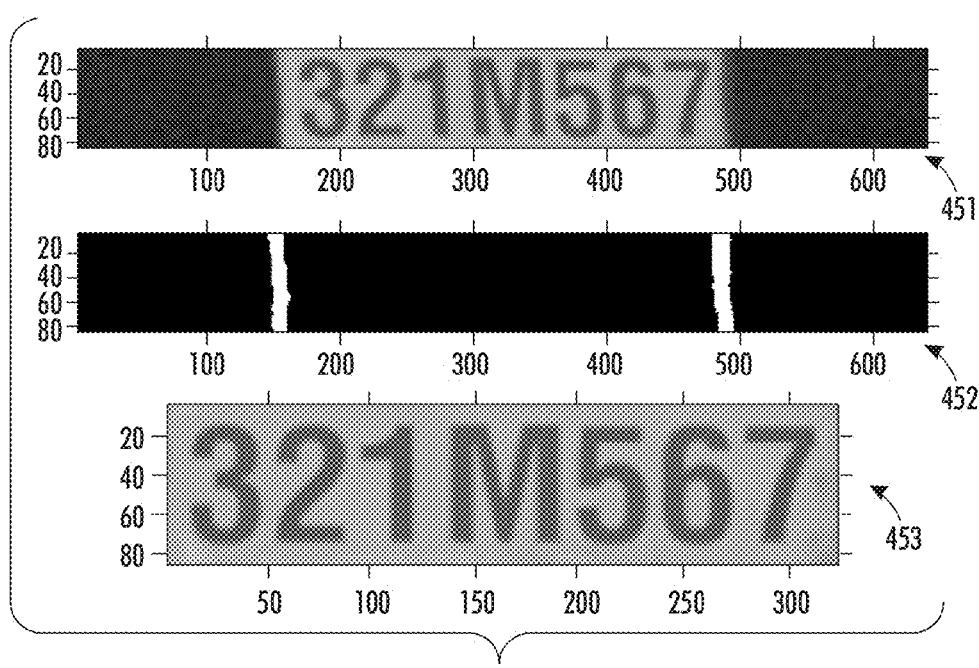
FIG. 8 illustrates an exemplary pictorial illustration of gradient-based methods for horizontal cropping of license plates, in accordance with the disclosed embodiments.

FIG. 8 illustrates an exemplary pictorial illustration 450 of successful gradient-based methods for horizontal cropping of license plates, in accordance with the disclosed embodiments. Gradient-based methods can also be applied to the horizontal cropping of license plates. Here, the original TRVC image is shown 451, followed by the binarized gradient 452 (license plate edge detection result), and finally the image cropped using this gradient information 453.

Figure 9:
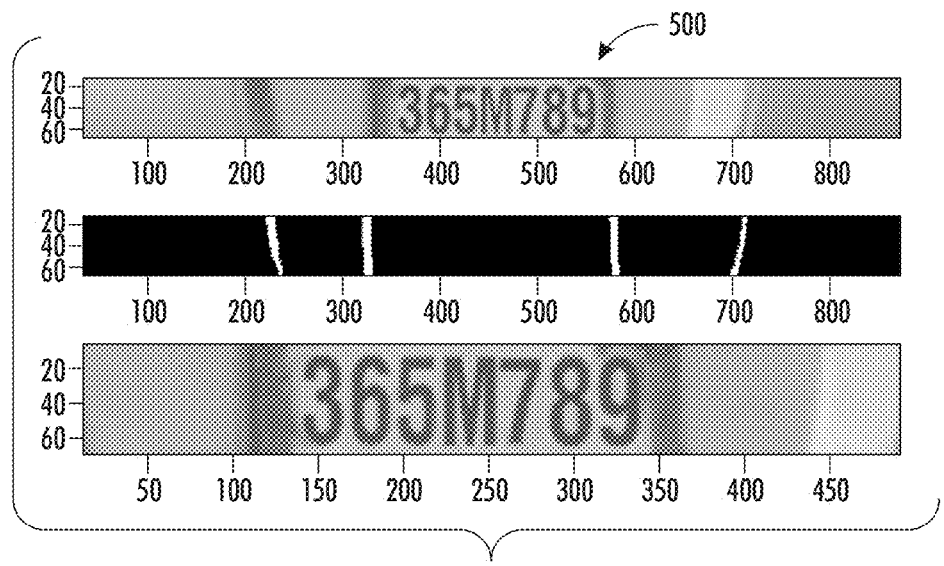
FIG. 9 illustrates an exemplary pictorial illustration of failed gradient-based cropping due to extraneous edge content, in accordance with the disclosed embodiments.

FIG. 9 illustrates an exemplary pictorial illustration 500 of failed gradient-based cropping due to extraneous edge content, in accordance with the disclosed embodiments. The gradient-based technique fails to correctly identify the horizontal cropping boundaries due to the strong edge content outside of the license plate region.

Figure 10:
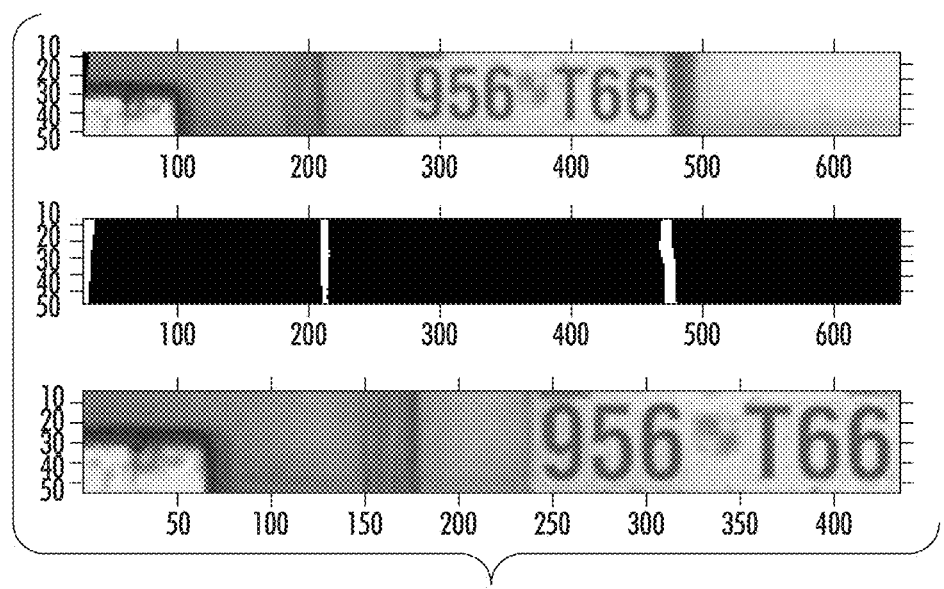
FIG. 10 illustrates an exemplary pictorial illustration of failed gradient-based cropping due to weak license plate edge, in accordance with the disclosed embodiments.
Figure 11:
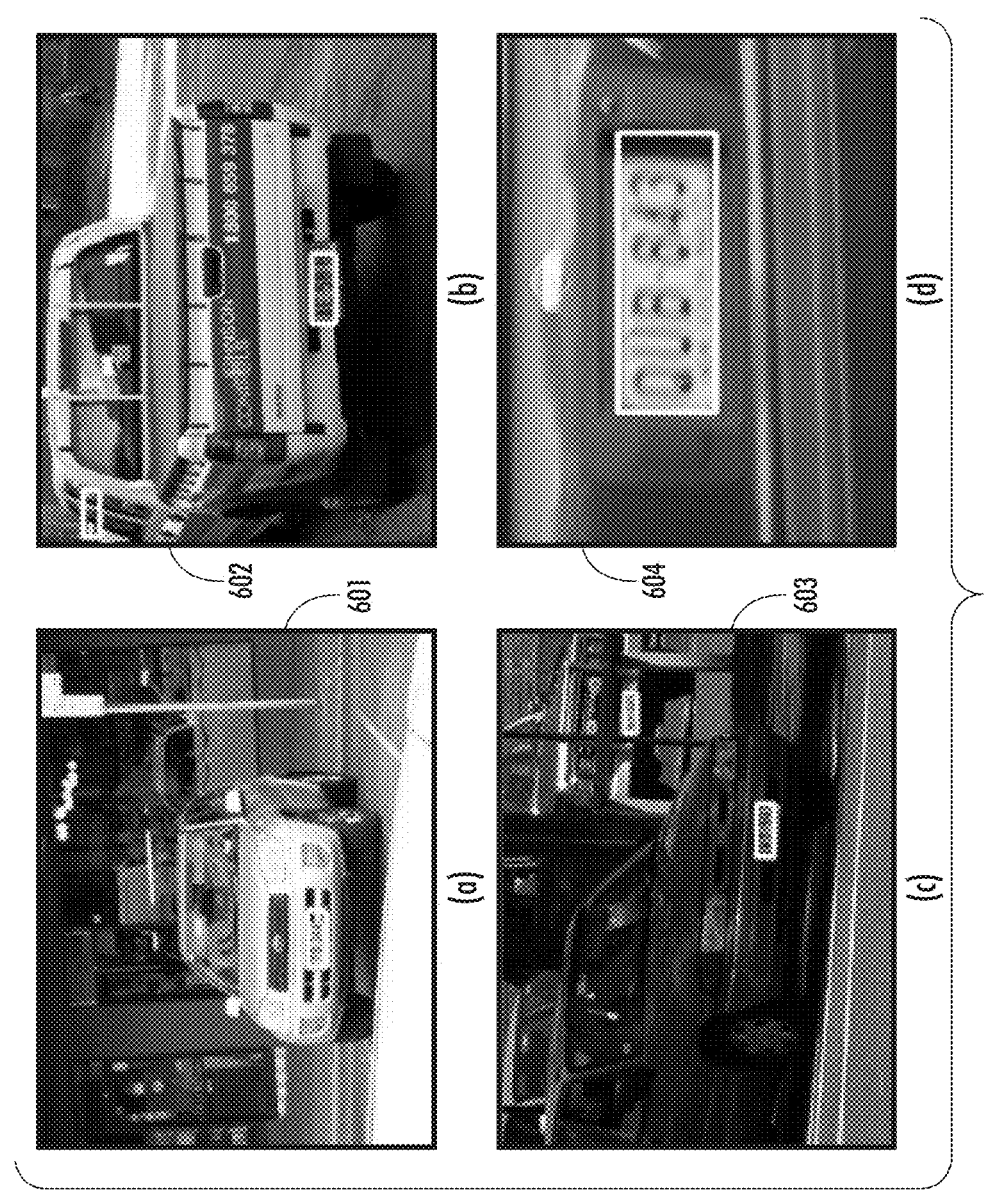
FIGS. 11A to 11D illustrate exemplary pictorial illustrations of several failure modes associated with image-based classifiers used for license plate localization, in accordance with the disclosed embodiments.

FIG. 10 illustrates an exemplary pictorial illustration of failed gradient-based cropping due to weak license plate edge, in accordance with the disclosed embodiments. When there is poor contrast between the license plate and the background image, gradient-based cropping can fail.

FIGS. 11A to 11D illustrate exemplary pictorial illustrations 600 of several failure modes associated with image-based classifiers used for license plate localization, in accordance with the disclosed embodiments. Cropping techniques that rely on some form of image-based classifier can also be employed. Image-based classifiers can be well suited for localizing the plate (i.e. detecting the presence of the plate in a region of the original image), but not for accurate horizontal cropping of the license plate sub-image. This is easily seen in the successful localization examples wherein several cropping failure modes can be observed: dropped characters 602, 603 and inclusion of border artifacts 601, 604.

Figure 12:
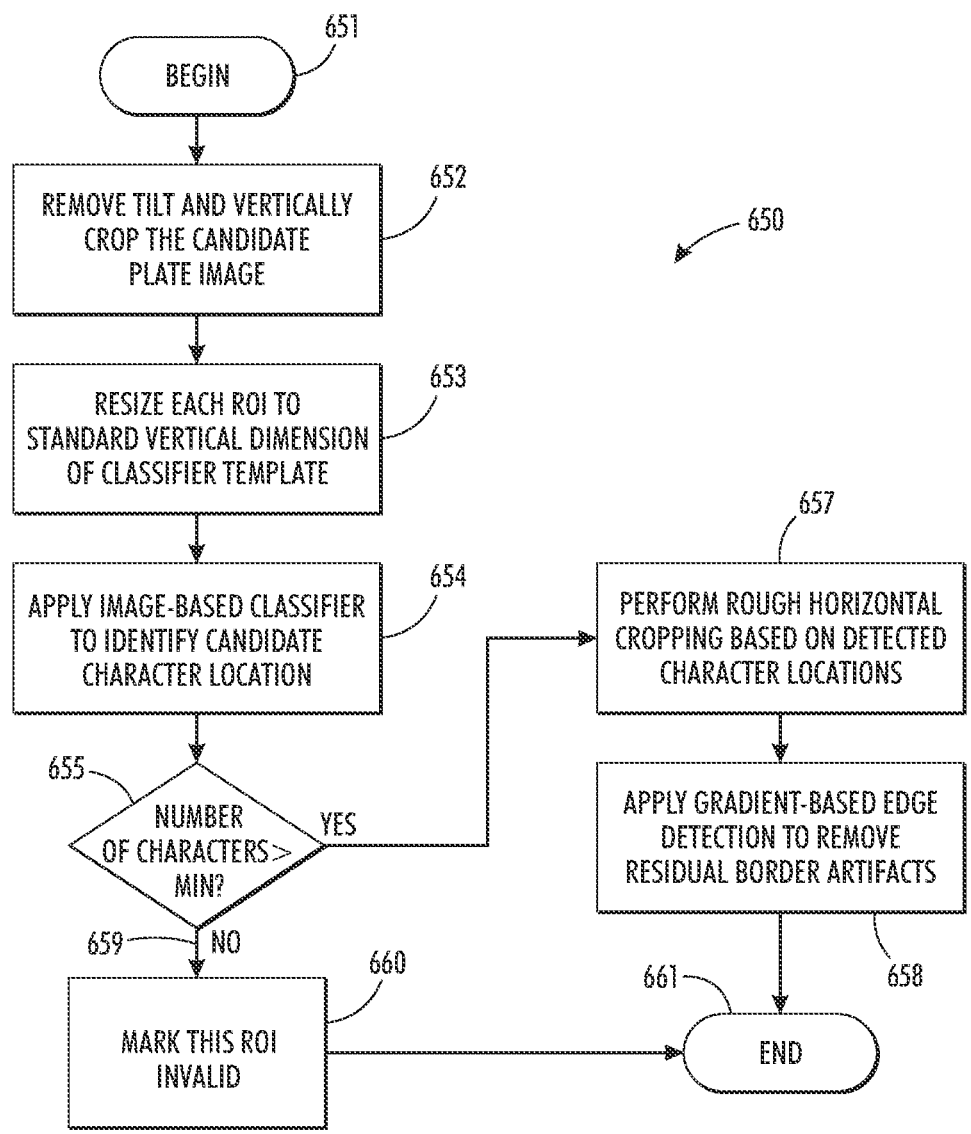
FIG. 12 illustrates an exemplary high level flowchart of the disclosed license plate cropping method, in accordance with the disclosed embodiments.

FIG. 12 illustrates an exemplary high level flowchart 650 of the disclosed license plate cropping method, in accordance with the disclosed embodiments. The disclosed embodiments provide a method for identifying and horizontally cropping a valid license plate region. The method is robust to border artifacts, logos, special symbols, and strong image content outside the valid license plate region of the image. With correct horizontal cropping, accuracy of the subsequent character segmentation and recognition steps significantly improves.

The license plate identification begins, as illustrated in block 651. Next, tilt is removed from the candidate plate image, along with vertically cropping the image, as illustrated in block 652. As illustrated in block 653, each ROI is resized to standard vertical dimensions of a classifier template. Next, an image-based classifier is applied and swept across the candidate license plate image to identify candidate character locations, as illustrated in block 654. This classifier serves as a valid character detector to indicate the subset of the image where character images likely reside. It can be assumed that a valid license plate sub-image is bounded by the left-most and right-most detected characters. If the number of characters 655 exceeds a minimum number 656, then a rough horizontal cropping is performed on detected character locations, as illustrated in block 657. Following this step, gradient-based edge detection is applied to remove residual border artifacts, as illustrated in block 658. The identification process then ends as illustrated in block 661. If the number of characters 655 does not exceed a minimum number 659, the ROI is marked as invalid, as illustrated in block 660. Thereafter, the process ends as illustrated in block 661.

Figure 13:
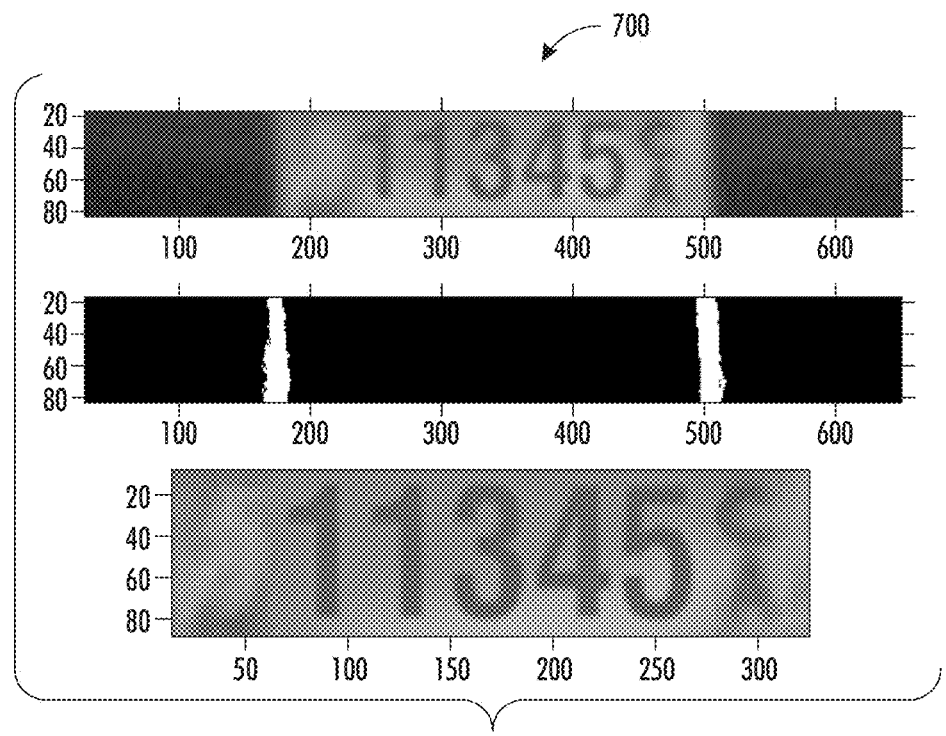
FIG. 13 illustrates an exemplary pictorial illustration of gradient-based cropping failures due to special symbols, in accordance with the disclosed embodiments.
Figure 14:
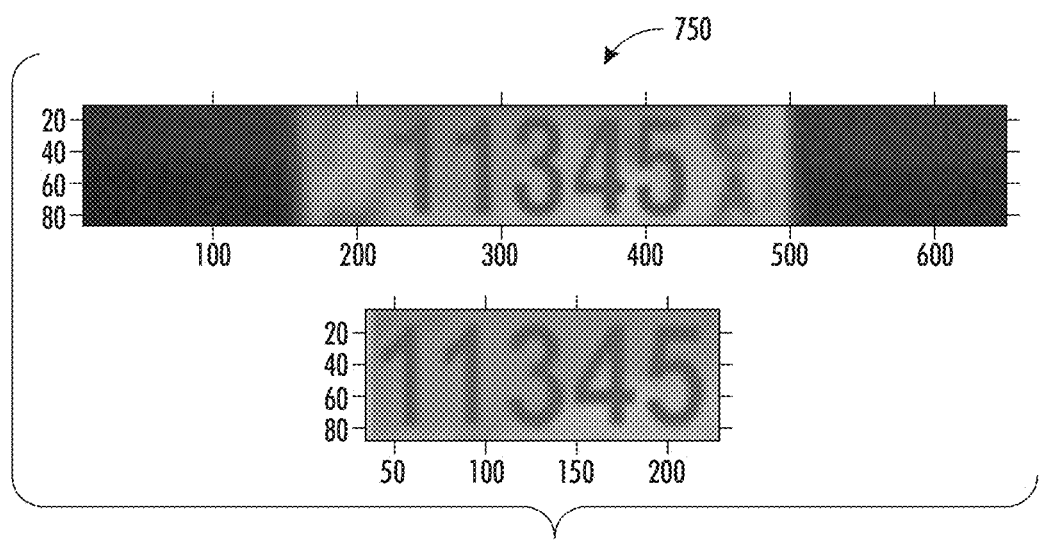
FIG. 14 illustrates an exemplary pictorial illustration of correctly rejecting special symbols utilizing a classifier-based approach, in accordance with the disclosed embodiments.
Figure 15:
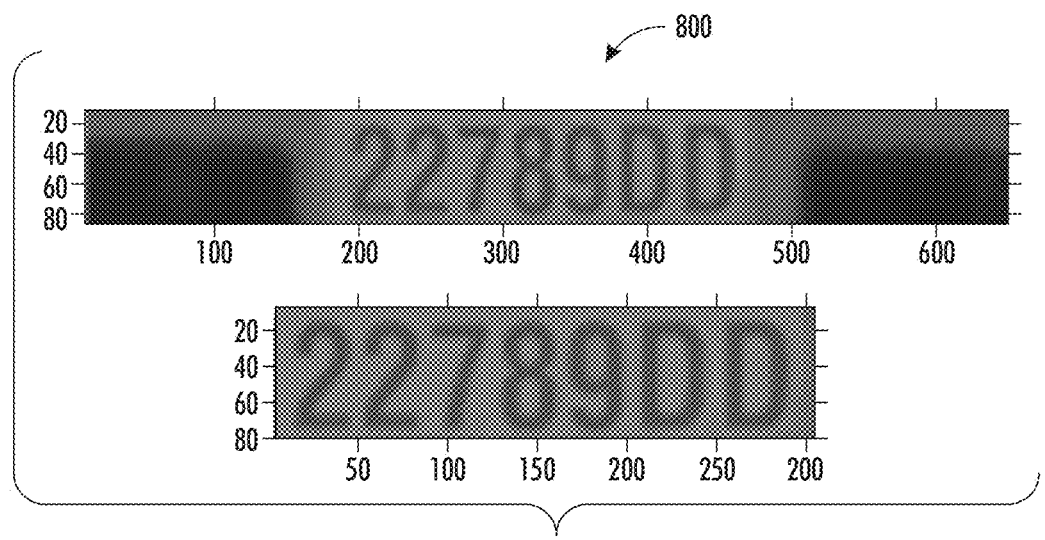
FIG. 15 illustrates an exemplary pictorial illustration of successful cropping a license plate image utilizing image-based classifier, in accordance with the disclosed embodiments.

FIG. 15 illustrates an exemplary pictorial illustration 800 of successful cropping a license plate image utilizing image-based classifier, in accordance with the disclosed embodiments. An image-based classifier can be trained to distinguish between valid characters/symbols and other license plate/vehicle content. For example, in a preferred embodiment the Sparse Network of Winnows ("SNoW") classifier is used to identify valid symbol locations and to crop the license plate based on the location results. The SNoW-based classifier leverages high-dimensional features while maintaining computational efficiency at run-time. A SNoW-based technique is more robust than gradient-based approaches for dealing with varying distances between valid license plate characters, license plate borders, and special symbols or logos on the plate (as illustrated in an exemplary pictorial illustration 700 in FIG. 13 and exemplary pictorial illustration 750 in FIG. 14). The SNoW-based method is capable of the tight localization required for cropping. In a disclosed embodiment, detection of valid character locations uses a SNoW-based machine learning classifier architecture operating on local image features derived utilizing the Successive Mean Quantization Transform ("SMQT"). The SMQT features are robust to scale and offset noise, such as, for example, the strong illumination variations typically seen in license plate images.

Figure 16:
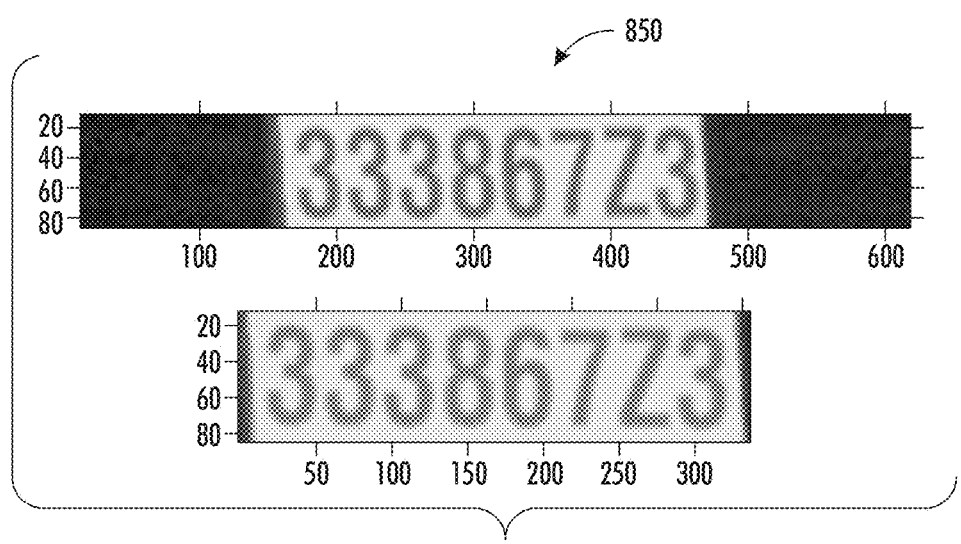
FIG. 16 illustrates an exemplary pictorial illustration of faulty classifier-based cropping due to plate border artifact, in accordance with the disclosed embodiments.
Figure 17:
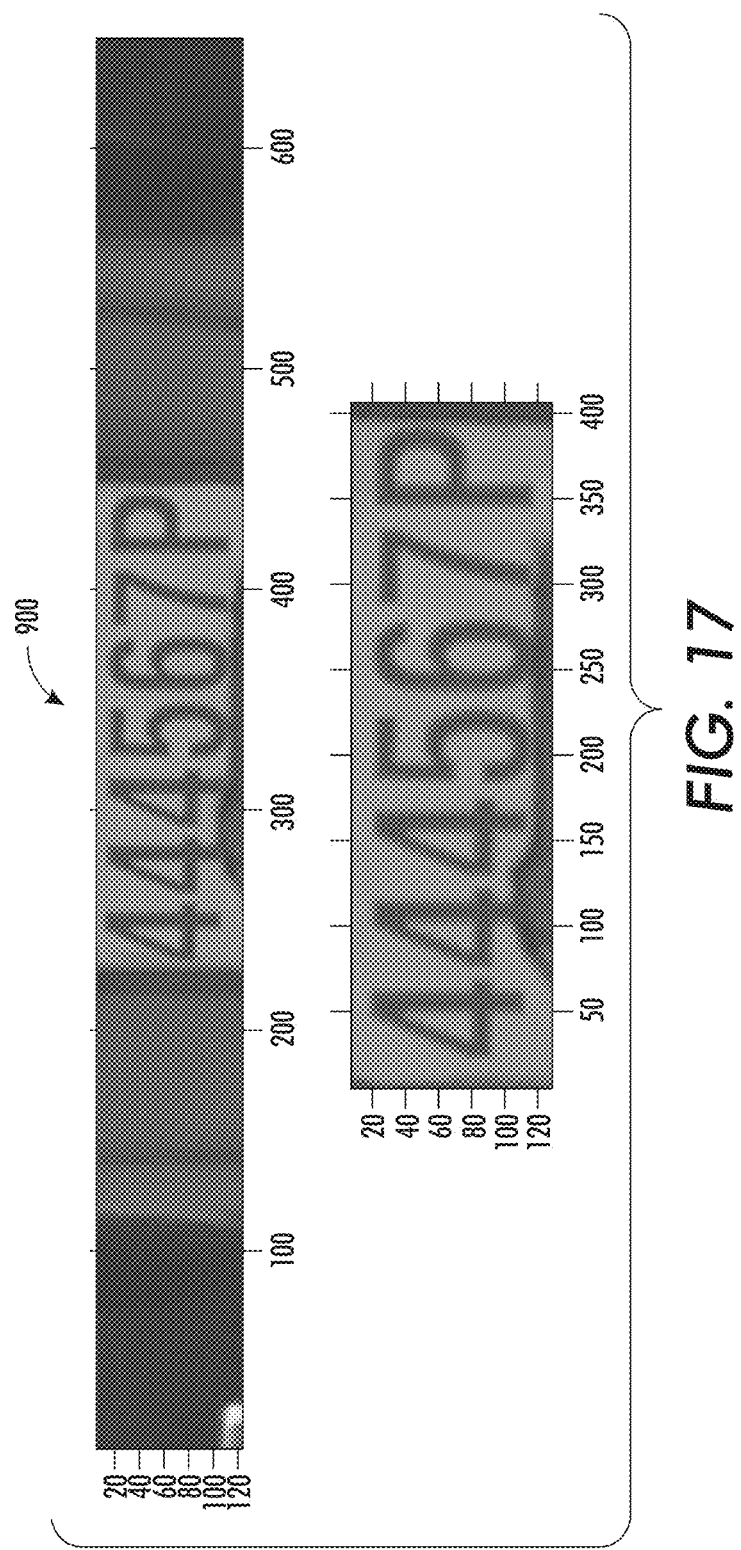
FIG. 17 illustrates an exemplary pictorial illustration of faulty classifier-based cropping due to plate border artifact, in accordance with the disclosed embodiments.

FIGS. 16 and 17 illustrate exemplary pictorial illustrations 850, 900, respectively, of faulty classifier-based cropping due to plate border artifact, in accordance with the disclosed embodiments.

Figure 18:
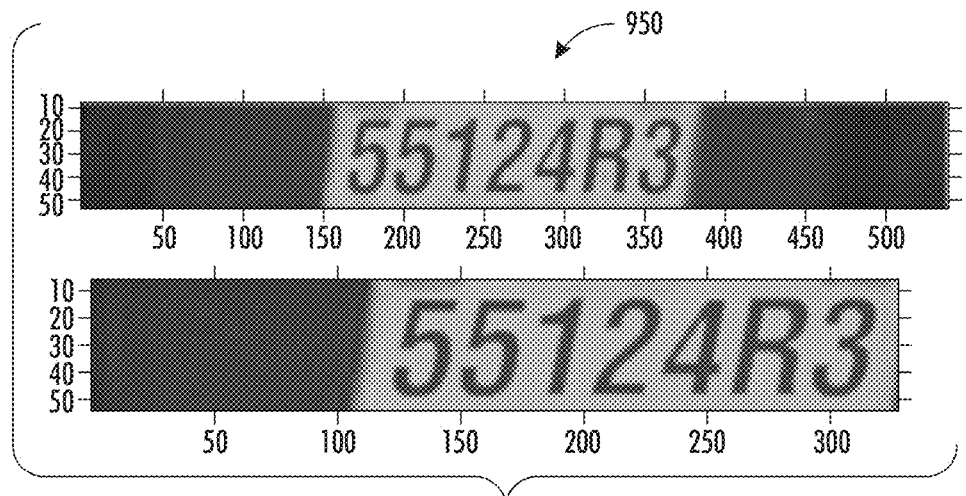
FIG. 18 illustrates an exemplary pictorial illustration of faulty classifier-based cropping due to a false alarm, in accordance with the disclosed embodiments.

FIG. 18 illustrates an exemplary pictorial illustration 950 of faulty classifier-based cropping due to a false alarm, in accordance with the disclosed embodiments. Because of the need to identify valid characters under conditions of extremely poor contrast, classifier-based approaches can suffer from false alarms. More specifically, vertical content in the region around the license plate can often be mistaken for a "1," or a "false alarm," under poor illumination conditions.

Image-based character detectors can discard logos, special symbols, and other strong image content outside the plate region. This type of classifier, however, can struggle with border artifacts, as illustrated in FIGS. 16 and 17. To remove these remaining artifacts, the present invention applies a gradient-based analysis step to fine tune the cropping boundaries obtained from the image-based classifier.

Figure 19:
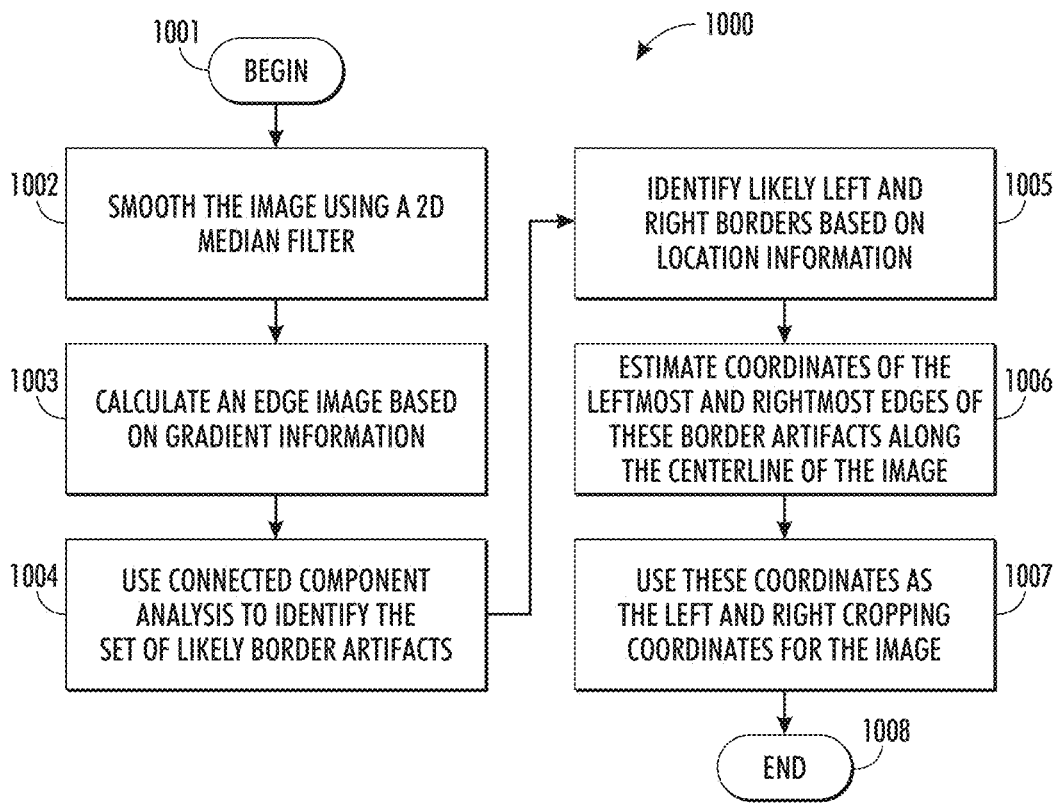
FIG. 19 illustrates an exemplary high level flowchart for gradient based fine-tuning of cropping coordinates, in accordance with the disclosed embodiments.

FIG. 19 illustrates an exemplary high level flowchart 1000 for gradient based fine-tuning of cropping coordinates, in accordance with the disclosed embodiments. The fine-tuning process beings, as illustrated in block 1001. After smoothing the image with a D median filter, as illustrated in block 1002, the gradient of the edge image is computed at each pixel location, as illustrated in block 1003. The gradient magnitude is then computed by utilizing a weighted sum of the horizontal (x) and vertical (y) components as follows:

$$G(x,y) = a_x g_x(x,y) + a_y g_y(x,y) \quad (1)$$

Here the $G(x,y)$ is the overall weighted gradient magnitude, $g_y(x,y)$ is the raw horizontal gradient magnitude and $g_y(x,y)$ the raw vertical gradient magnitude at pixel location $(x,y)$. In a preferred embodiment, the weights for the x and y components in this sum, $a_x$ and $a_y$, are set to 10.0 and 1.0, respectively. The gradient matrix in (1) is then normalized and converted to a binary image (i.e., an edge image). Connected components ("CCs") are identified and a screening is implemented to determine the most likely plate border blobs, as illustrated in block 1004. The sequence of pruning operations includes the following characteristics, for example:

Borders artifacts should extend from top to bottom in the vertically cropped image with anything too short being discarded.

The border edges should be substantially vertical with too much tilt being discarded.

The aspect ratio (i.e., height divided by width) of CCs due to plate borders should exceed a predetermined threshold. Anything not sufficiently tall, as compared to its width, is discarded.

After pruning, the candidate plate border/edge CCs are used to identify likely left and right license plate borders based on location information, as illustrated in block 1005. Any combination of zero or more edge artifacts could remain on the right and left of the plate (e.g., none found on the left but one on the right, multiple artifacts on both the left and the right, etc.). The coordinates of the leftmost and rightmost edges of border artifacts are estimated along the centerline of the image, as illustrated in block 1006. The CCs are sorted based on their horizontal center coordinate. Next, all those CCs are labeled whose center coordinate is less than the center of the plate as "left borders" and all those greater than or equal to the center of the plate as "right borders." At this point, there could be zero or more CCs in both the left and right border groups. If there is at least one left border CC, the one with the largest gradient content is selected according to (2). The cropping coordinates can be used as the left and right cropping coordinates for the images, as illustrated in block 1007. It is assumed that the gray value of the plate will be brighter than that of the background. A large gradient magnitude with a dark to light transition is sought.

$$i_{left} = \arg\max_i \sum_{(x,y) \in S_i} G_x(x, y) \quad (2)$$

Here, $G_x(x,y)$ is the magnitude of the horizontal (x) component of the image gradient evaluated at pixel location (x,y), i is the connected component blob index, and $S_i$ is the subset of the image pixels that are contained within the area of the connected component $CC_i$. If no left borders were found, then no cropping occurs along the left side of the image produced by the image classifier step.

The right plate edge cropping coordinate is obtained in a similar fashion, with the exception of looking for the most dominant light to dark transition:

$$i_{right} = \arg\min_{i} \sum_{(x,y) \in S_i} G_x(x, y) \quad (3)$$

Both (2) and (3) are indices of the connected components from the edge analysis that are believed to be the plate borders. The cropping process ends, as illustrated in block 1008.

Figure 20:
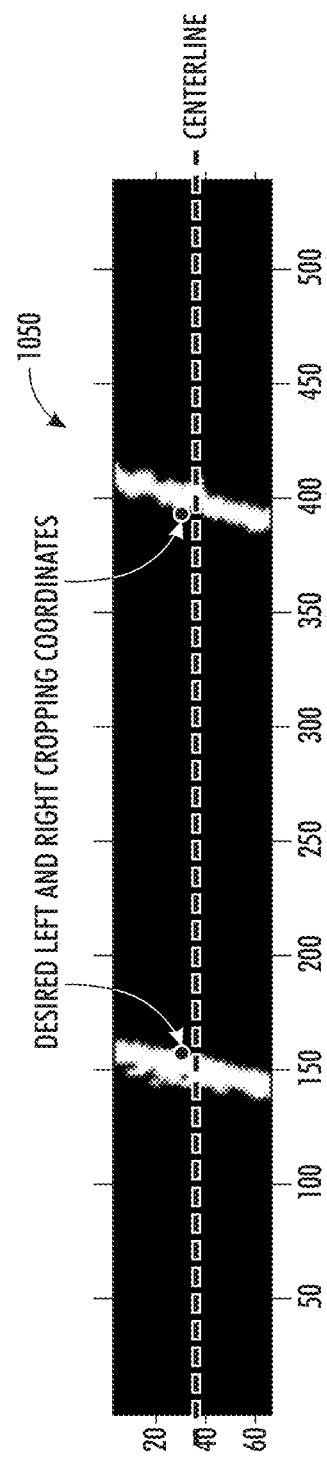
FIG. 20 illustrates an exemplary graphical illustration of selected left and right gradient CCs and desired cropping coordinates, in accordance with the disclosed embodiments.
Figure 21:
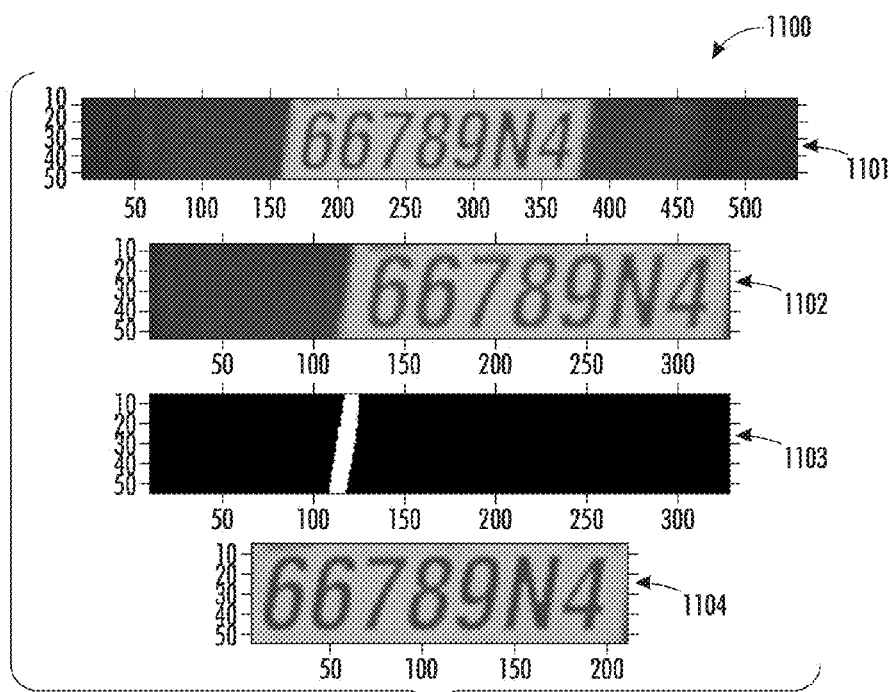
FIG. 21 illustrates an exemplary pictorial illustration of correctly cropped license plate images, in accordance with the disclosed embodiments.
Figure 22:
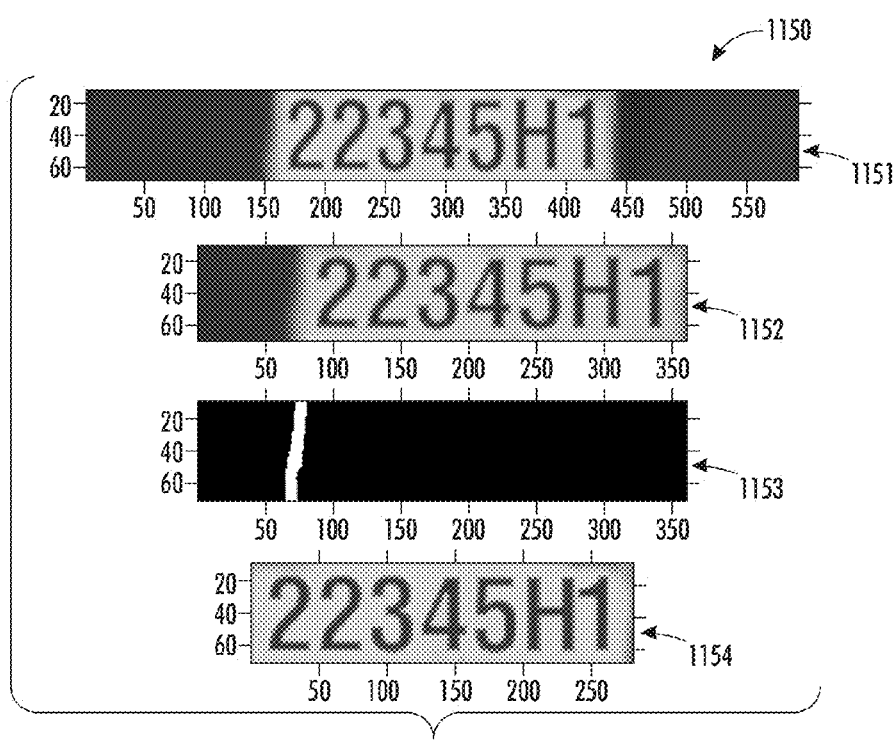
FIG. 22 illustrates an exemplary pictorial illustration of correctly cropped license plate images, in accordance with the disclosed embodiments.
Figure 23:
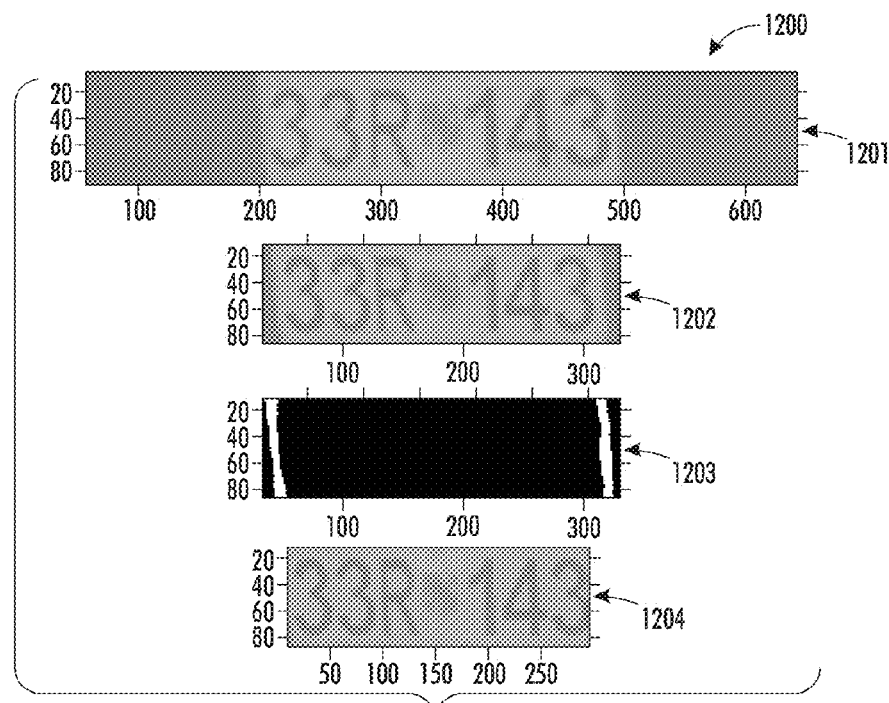
FIG. 23 illustrates an exemplary pictorial illustration of correctly cropped license plate images, in accordance with the disclosed embodiments.
Figure 24:
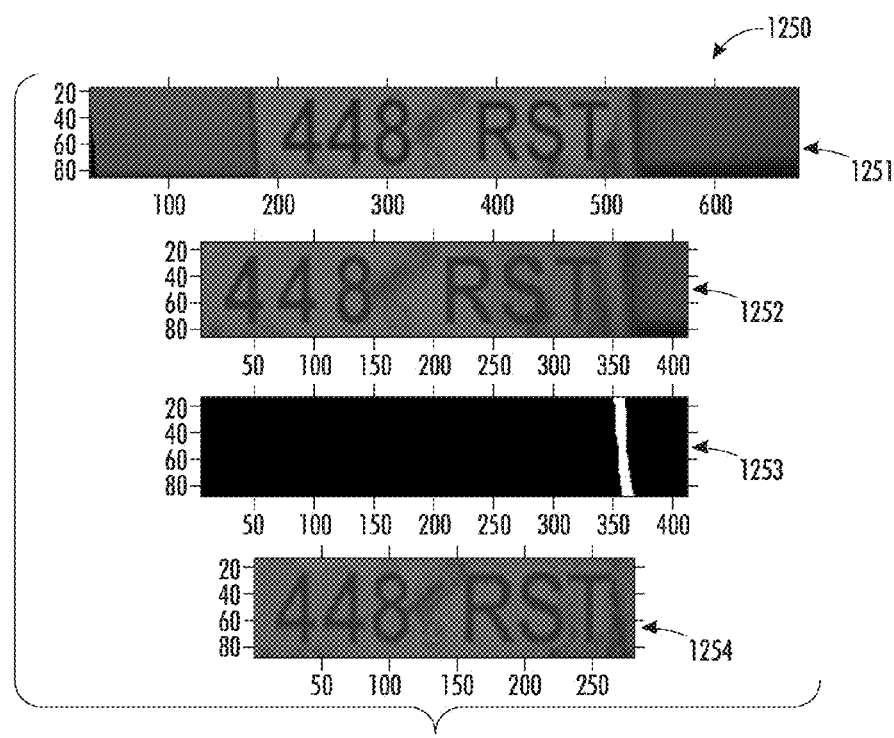
FIG. 24 illustrates an exemplary pictorial illustration of correctly cropped license plate images, in accordance with the disclosed embodiments.

FIG. 20 illustrates an exemplary graphical illustration 1050 of selected left and right gradient CCs and desired cropping coordinates, in accordance with the disclosed embodiments. To obtain the desired cropping coordinates, the horizontal coordinate is found along the centerline of the image for the inside edge (towards the interior of the license plate) of the identified CC blobs.

FIGS. 21, 22, 23, and 24 illustrate exemplary pictorial illustrations 1100, 1150, 1200, 1250, respectively, of correctly cropped license plate images, in accordance with the disclosed embodiments. In each of these cases, the sequence of sub-images in the figure is: 1) the original TRVC image 1101, 1151, 1201, 1251, 2) the output of the image classifier stage 1102, 1152, 1202, 1252, 3) the edge image obtained as part of the gradient-based analysis 1103, 1153, 1203, 1253, and 4) the resulting cropped TBB image utilizing both the image classifier and gradient information 1104, 1154, 1204, 1254.

Based on the foregoing, it can be appreciated that a number of different embodiments, preferred and alternative are disclosed herein. For example, in one embodiment, a method for robust cropping of a license plate image is disclosed. The method can include steps for: identifying a first detail of the license plate image utilizing an image-based classifier; identifying a second detail of the license plate image utilizing a gradient-based classifier; and utilizing the identified first detail and the identified second detail to accurately recognize and identify a license plate in the license plate image.

In other embodiments, identifying the first detail of the license plate image utilizing the image-based classifier can include a step for roughly identifying a location of a character on the license plate image. The first detail can include at least one of: a character, a valid character, a symbol, a special symbol, a logo, a license plate border, a license plate border with poor contrast, no detectable plate border, and extraneous edge information outside of the license plate. The first detail can also include a noise source, the noise source comprising at least one of: residual plate rotation, shear in a character within the license plate image, a heavy shadow, non-uniform illumination, challenging optical geometry, tilt, shear, projective distortion, a license plate frame, a license plate sticker, a license plate frame that covers or partially covers a character on the license plate, a license plate sticker that covers or partially covers a character on the license plate, partial occlusion of a character, a trailer hitch ball, poor contrast, general license plate image noise, and salt and pepper noise.

In another embodiment, identifying the second detail of the license plate image utilizing the gradient-based classifier can include a step for fine-tuning the second detail for robustness for a license plate edge effect, a license plate frame, a license plate border artifact, and excessive character shear to improve segmentation and character recognition results. The second detail can include at least one of: a character, a valid character, a symbol, a special symbol, a logo, a license plate border, a license plate border with poor contrast, no detectable plate border, and extraneous edge information outside of the license plate.

In yet other embodiments, the method can include steps for: tightly cropping the license plate image to create a license plate sub-image utilizing the image-based classifier and the gradient-based classifier, wherein tightly cropping the license plate image comprises horizontally cropping the license plate image to account for a noise source and an interfering artifact in the license plate image; at least one of removing a logo from the license plate sub-image, removing a symbol from the license plate sub-image, and flagging an artifact from the license plate sub-image before submitting the license plate sub-image for character recognition; identifying a license plate edge artifact utilizing the gradient-based classifier on the license plate sub-image to accurately determine a license plate border artifact for removal without incorrectly discarding a valid license plate character; capturing the license plate image; and localizing the license plate image.

In another embodiment, the method can include steps for: extracting a tight bounding box license plate sub-image to reduce noise present in the license plate image; extracting a license plate character from the tight bounding box license plate sub-image via at least one of: tilt removal, vertical cropping, and horizontal cropping; segmenting the license plate character in the tight bounding box license plate sub-image for a robust, highly accurate, computationally efficient solution to recognize the license plate character and identify the license plate; and identifying the first detail and the second detail utilizing a Sparse Network of Winnows classifier, wherein the Sparse Network of Winnows classifier accounts for at least one of: varying distances between characters on the license plate, a license plate border, a symbol, a special symbol, and logos on the license plate.

In other embodiments, a system for robust cropping of a license plate image is disclosed. The system can include a processor, a data bus coupled to the processor; and a computer-usable tangible storage device storing computer program code, the computer program code comprising program instructions executable by the processor for robust cropping of a license plate image. The program instructions can include: program instructions to identify a first detail of the license plate image utilizing an image-based classifier; program instructions to identify a second detail of the license plate image utilizing a gradient-based classifier; and program instructions to use the identified first detail and the identified second detail to accurately recognize and identify a license plate in the license plate image.

In another embodiment, the program instruction to identify the first detail of the license plate image utilizing the image-based classifier can include program instructions to roughly identify a location of a character on the license plate image, wherein the first detail comprises at least one of: a character, a valid character, a symbol, a special symbol, a logo, a license plate border, a license plate border with poor contrast, no detectable plate border, and extraneous edge information outside of the license plate. The first detail comprises a noise source, the noise source comprising at least one of: residual plate rotation, shear in a character within the license plate image, a heavy shadow, non-uniform illumination, challenging optical geometry, tilt, shear, projective distortion, a license plate frame, a license plate sticker, a license plate frame that covers or partially covers a character on the license plate, a license plate sticker that covers or partially covers a character on the license plate, partial occlusion of a character, a trailer hitch ball, poor contrast, general license plate image noise, and salt and pepper noise.

In other embodiments, the program instructions to identify the second detail of the license plate image utilizing the gradient-based classifier can further include program instructions to fine-tune the second detail for robustness for a license plate edge effect, a license plate frame, a license plate border artifact, and excessive character shear to improve segmentation and character recognition results, wherein the second detail comprises at least one of: a character, a valid character, a symbol, a special symbol, a logo, a license plate border, a license plate border with poor contrast, no detectable plate border, and extraneous edge information outside of the license plate.

In yet other embodiments, the system can include: program instructions to tightly crop the license plate image to create a license plate sub-image utilizing the image-based classifier and the gradient-based classifier, wherein tightly cropping the license plate image comprises horizontally cropping the license plate image to account for a noise source and an interfering artifact in the license plate image; at least one of program instructions to remove a logo from the license plate sub-image, program instructions to remove a symbol from the license plate sub-image, and program instructions to flag an artifact from the license plate sub-image before submitting the license plate sub-image for character recognition; program instructions to identify a license plate edge artifact utilizing the gradient-based classifier on the license plate sub-image to accurately determine a license plate border artifact for removal without incorrectly discarding a valid license plate character; program instructions to capture the license plate image; and program instructions to localize the license plate image.

In another embodiment, the system of can include: program instructions to extract a tight bounding box license plate sub-image to reduce noise present in the license plate image; program instructions to extract a license plate character from the tight bounding box license plate sub-image via at least one of: tilt removal, vertical cropping, and horizontal cropping; program instructions to segment the license plate character in the tight bounding box license plate sub-image for a robust, highly accurate, computationally efficient solution to recognize the license plate character and identify the license plate; and program instructions to identify the first detail and the second detail utilizing a Sparse Network of Winnows classifier, wherein the Sparse Network of Winnows classifier accounts for at least one of: varying distances between characters on the license plate, a license plate border, a symbol, a special symbol, and logos on the license plate.

In yet another embodiment, a computer-usable tangible storage device storing computer program code is disclosed. The computer program code can include program instructions executable by a processor for robust cropping of a license plate image. The program instructions can further include: program instructions to identify a first detail of the license plate image utilizing an image-based classifier; program instructions to identify a second detail of the license plate image utilizing a gradient-based classifier; and program instructions to use the identified first detail and the identified second detail to accurately recognize and identify a license plate in the license plate image.

In other embodiments, the computer-usable tangible storage device can include program instruction to identify the first detail of the license plate image utilizing the image-based classifier further comprises program instructions to roughly identify a location of a character on the license plate image, wherein the first detail comprises at least one of: a character, a valid character, a symbol, a special symbol, a logo, a license plate border, a license plate border with poor contrast, no detectable plate border, and extraneous edge information outside of the license plate, wherein the first detail comprises a noise source, the noise source comprising at least one of: residual plate rotation, shear in a character within the license plate image, a heavy shadow, non-uniform illumination, challenging optical geometry, tilt, shear, projective distortion, a license plate frame, a license plate sticker, a license plate frame that covers or partially covers a character on the license plate, a license plate sticker that covers or partially covers a character on the license plate, partial occlusion of a character, a trailer hitch ball, poor contrast, general license plate image noise, and salt and pepper noise.

In another embodiment, the computer-usable tangible storage device can include program instructions to identify the second detail of the license plate image utilizing the gradient-based classifier further comprises program instructions to fine-tune the second detail for robustness for a license plate edge effect, a license plate frame, a license plate border artifact, and excessive character shear to improve segmentation and character recognition results, wherein the second detail comprises at least one of: a character, a valid character, a symbol, a special symbol, a logo, a license plate border, a license plate border with poor contrast, no detectable plate border, and extraneous edge information outside of the license plate.

In yet another embodiment, the computer-usable tangible storage device can include: program instructions to tightly crop the license plate image to create a license plate sub-image utilizing the image-based classifier and the gradient-based classifier, wherein tightly cropping the license plate image comprises horizontally cropping the license plate image to account for a noise source and an interfering artifact in the license plate image; at least one of program instructions to remove a logo from the license plate sub-image, program instructions to remove a symbol from the license plate sub-image, and program instructions to flag an artifact from the license plate sub-image before submitting the license plate sub-image for character recognition; program instructions to identify a license plate edge artifact utilizing the gradient-based classifier on the license plate sub-image to accurately determine a license plate border artifact for removal without incorrectly discarding a valid license plate character; program instructions to capture the license plate image; program instructions to localize the license plate image; program instructions to extract a tight bounding box license plate sub-image to reduce noise present in the license plate image; program instructions to extract a license plate character from the tight bounding box license plate sub-image via at least one of: tilt removal, vertical cropping, and horizontal cropping; program instructions to segment the license plate character in the tight bounding box license plate sub-image for a robust, highly accurate, computationally efficient solution to recognize the license plate character and identify the license plate; and program instructions to identify the first detail and the second detail utilizing a Sparse Network of Winnows classifier, wherein the Sparse Network of Winnows classifier accounts for at least one of: varying distances between characters on the license plate, a license plate border, a symbol, a special symbol, and logos on the license plate.

It will be appreciated that variations of the above-disclosed and other features and functions, or alternatives thereof, may be desirably combined into many other different systems or applications. Furthermore, various presently unforeseen or unanticipated alternatives, modifications, variations or improvements therein may be subsequently made by those skilled in the art which are also intended to be encompassed by the following claims.

What is claimed is:

1. A method for cropping of a license plate image, said method comprising:
    identifying a first plurality of details of said license plate image utilizing an image-based classifier that serves as a valid character detector to indicate a subset of said license plate image where character images likely reside wherein said first plurality of details comprise at least one of: a character, a valid license plate character, a symbol, a logo, a license plate border, a license plate border with poor contrast, and extraneous edge information outside of said license plate;
    resizing said subset of said license plate image where character images likely reside to a standard vertical dimension associated with a classifier template;
    identifying candidate character locations of said license plate image and determining if said candidate character locations exceed a minimum number of characters;
    performing a first cropping of said license plate image including removing tilt from and vertically cropping said license plate image;
    identifying a second detail of said license plate image utilizing a gradient-based classifier on said candidate character locations and performing a second cropping of said first cropping of said license plate image based on detected character locations, further comprising a horizontal cropping via projective segmentation of said license plate image based on said detected character locations, if said candidate character locations exceed said minimum number of characters; and
    utilizing said identified first plurality of details and said identified second detail to recognize and identify a license plate in said license plate image;
    further comprising identifying said first plurality of details and said second detail utilizing a Sparse Network of Winnows classifier, wherein said Sparse Network of Winnows classifier accounts for the following: varying distances between characters on said license plate, a license plate border, a symbol, and logos on said license plate.

2. The method of claim 1 wherein said plurality of details comprise a at least one noise source, said at least one noise source comprising at least one of: plate rotation, shear in a character within said license plate image, a shadow, non-uniform illumination, tilt, shear, projective distortion, a license plate frame, a license plate sticker, a license plate frame that covers or partially covers a character on said license plate, a license plate sticker that covers or partially covers a character on said license plate, partial occlusion of a character, a trailer hitch ball, and salt and pepper noise.

3. The method of claim 1 wherein identifying said second detail of said license plate image utilizing said gradient-based classifier further comprises fine-tuning said second detail for robustness for a license plate frame, a license plate border artifact, and character shear to improve segmentation and character recognition results.

4. The method of claim 3 wherein said second detail comprises a plurality of details comprising at least one of: a character, a valid license plate character, a symbol, a license plate special symbol, a logo, a license plate border, a license plate border with poor contrast, no detectable plate border, and extraneous edge information outside of said license plate.

5. The method of claim 1 further comprising:
    cropping said license plate image with said image-based classifier and said gradient-based classifier to create a license plate sub-image, wherein cropping said license plate image comprises horizontally cropping said license plate image to account for a noise source and an interfering artifact in said license plate image;
    at least one of removing a logo from said license plate sub-image, removing a symbol from said license plate sub-image, and flagging an artifact from said license plate sub-image before submitting said license plate sub-image for character recognition;
    identifying a license plate edge artifact utilizing said gradient-based classifier on said license plate sub-image to determine a license plate border artifact for removal without incorrectly discarding a valid license plate character;
    capturing said license plate image; and
    localizing said license plate image.

6. The method of claim 1 further comprising:
    extracting a bounding box license plate sub-image to reduce noise present in said license plate image;
    extracting a license plate character from said bounding box license plate sub-image via the following: tilt removal, vertical cropping, and horizontal cropping; and
    segmenting said license plate character in said bounding box license plate sub-image to recognize said license plate character and identify said license plate.

7. A system for cropping of a license plate image, comprising:
    a processor that communicates electronically with a memory; and
    a non-transitory computer-usable medium embodying computer program code stored in said memory, said non-transitory computer-usable medium capable of communicating with said processor, said computer program code comprising instructions executable by said processor and configured for:
    identifying a first plurality of details of said license plate image utilizing an image-based classifier that serves as a valid character detector to indicate a subset of said license plate image where character images likely reside wherein said first plurality of details comprise at least one of:
    a character, a valid license plate character, a symbol, a special license plate symbol, a logo, a license plate border, a license plate border with poor contrast, and extraneous edge information outside of said license plate;
    resizing said subset of said license plate image where character images likely reside to a standard vertical dimension associated with a classifier template;

identifying candidate character locations of said license plate image and determining if said candidate character locations exceed a minimum number of characters;

performing a first cropping of said license plate image including removing tilt from and vertically cropping said license plate image;

identifying a second detail of said license plate image utilizing a gradient-based classifier on said candidate character locations and performing a second cropping of said first cropping of said license plate image based on detected character locations, further comprising a horizontal cropping via projective segmentation of said license plate image based on said detected character locations, if said candidate character locations exceed said minimum number of characters; and utilizing said identified first plurality of details and said identified second detail to recognize and identify a license plate in said license plate image;

further comprising identifying said first plurality of details and said second detail utilizing a Sparse Network of Winnows classifier, wherein said Sparse Network of Winnows classifier accounts for the following: varying distances between characters on said license plate, a license plate border, a symbol, and logos on said license plate.

8. The system of claim 7 wherein said instructions are further configured to fine-tune said second detail for robustness for a license plate frame, a license plate border artifact, and character shear to improve segmentation and character recognition results, wherein said second detail comprises a plurality of details comprising at least one of: a character, a valid license plate character, a symbol, a special license plate symbol, a logo, a license plate border, a license plate border with poor contrast, no detectable plate border, and extraneous edge information outside of said license plate.

9. The system of claim 7 wherein said instructions are further configured for:

cropping said license plate image to create a license plate sub-image utilizing said image-based classifier and said gradient-based classifier, wherein cropping said license plate image comprises horizontally cropping said license plate image to account for a noise source and an interfering artifact in said license plate image;

removing a logo from said license plate sub-image, program instructions to remove a symbol from said license plate sub-image, and program instructions to flag an artifact from said license plate sub-image before submitting said license plate sub-image for character recognition;

identifying a license plate edge artifact utilizing said gradient-based classifier on said license plate sub-image to determine a license plate border artifact for removal without incorrectly discarding a valid license plate character;

capturing said license plate image; and localizing said license plate image.

10. The system of claim 7 wherein said instructions are further configured for:

extracting a bounding box license plate sub-image to reduce noise present in said license plate image;

extracting a license plate character from said bounding box license plate sub-image via at least one of: tilt removal, vertical cropping, and horizontal cropping; and segmenting said license plate character in said bounding box license plate sub-image to recognize said license plate character and identify said license plate.

\* \* \* \* \*